United States Patent
Lai et al.

(10) Patent No.: US 10,754,786 B2
(45) Date of Patent: Aug. 25, 2020

(54) MEMORY ACCESS METHOD USING SIMPLIFIED MAPPING TABLE REQUIRING SMALLER MEMORY SPACE

(71) Applicant: SK hynix Inc., Gyeonggi-do (KR)

(72) Inventors: Ching-Chung Lai, Hsinchu County (TW); Lian-Chun Lee, Hsinchu County (TW)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 16/208,859

(22) Filed: Dec. 4, 2018

(65) Prior Publication Data

US 2019/0236021 A1    Aug. 1, 2019

(30) Foreign Application Priority Data

Jan. 30, 2018    (TW) .............................. 107103165 A (51) Int. Cl.
*G06F 12/1009*    (2016.01)
(52) U.S. Cl.
CPC .. *G06F 12/1009* (2013.01); *G06F 2212/1044* (2013.01); *G06F 2212/657* (2013.01)

(58) Field of Classification Search
CPC ......... G06F 12/1009; G06F 2212/1044; G06F 2212/657
See application file for complete search history.

(56) References Cited

U.S. PATENT DOCUMENTS

| | | | | |
|---|---|---|---|---|
| 9,552,289 B1* | 1/2017 | Spencer | ............. | G06F 12/0246 |
| 2013/0246689 A1 | 9/2013 | Matsudaira et al. | | |
| 2018/0293174 A1* | 10/2018 | Song | .................. | G06F 12/0246 |

* cited by examiner

*Primary Examiner* — Tasnima Matin
(74) *Attorney, Agent, or Firm* — IP & T Group LLP (57) ABSTRACT

A memory access method for selectively creating a simplified mapping table includes the steps of: selecting one of a plurality of partitions of an original mapping table so as to use one physical page address in a selected partition as a start physical page address; scanning each entry of the selected partition so as to search a randomly mapped entry in the selected partition; determining whether a memory space required for creating the simplified mapping table is smaller than a memory space required for the selected partition; and selectively storing the start physical page address, the number of the randomly mapped entries, and a logical page address and a physical page address recorded on each randomly mapped entry according to the determination result of the determining step so as to create a simplified mapping table.

12 Claims, 5 Drawing Sheets

| LPN Offset | PPN |
|---|---|
| 0 | 1314 |
| 1 | 111 |
| 2 | 112 |
| 3 | 113 |
| 4 | 114 |
| 5 | 115 |
| 6 | 116 |
| 7 | 117 |
| 8 | 118 |
| 9 | 119 |
| 10 | 120 |
| 11 | 121 |
| 12 | 122 |
| 13 | 123 |
| 14 | 124 |
| 15 | 125 |
| 16 | 126 |
| 17 | 127 |
| 18 | 128 |
| 19 | 129 |
| 20 | 130 |
| 21 | 38 |
| 22 | 614 |
| 23 | 1129 |
| 24 | 531 |
| 25 | 135 |
| 26 | 136 |
| 27 | 137 |
| 28 | 138 |
| 29 | 999 |
| 30 | 140 |
| 31 | 141 |

FIG.3

| Offset | PPN | |
|---|---|---|
| | 110 | ~data1 |
| | 6 | ~data2 |

| Offset | PPN | |
|---|---|---|
| 0 | 1314 | ~data3_1 |
| 21 | 38 | ~data3_2 |
| 22 | 614 | ~data3_3 |
| 23 | 1129 | ~data3_4 |
| 24 | 531 | ~data3_5 |
| 29 | 999 | ~data3_6 |

} data3

MEMORY ACCESS METHOD USING SIMPLIFIED MAPPING TABLE REQUIRING SMALLER MEMORY SPACE

CROSS-REFERENCE TO RELATED APPLICATION

The present application claims priority under 35 U.S.C. § 119(a) to Taiwan application number 107103165, filed on Jan. 30, 2018, in the Taiwan Intellectual Property Office, which is incorporated herein by reference in its entirety.

BACKGROUND

1. Technical Field

Various embodiments generally relate to a memory access method, and more particularly, to a memory access method capable of reading a memory device to establish a logic-to-physical address mapping table and improving memory performance.

2. Related Art

In a general computer architecture, a memory device is typically designed hierarchically. For example, a main memory is typically a lower memory device, and a cache memory is typically an upper memory device. Since the access time of the cache memory is less than the access time of the main memory, a processor can be designed to first search for requested data in the cache memory. When the processor cannot find the requested data in the cache memory, the processor then searches the main memory for such data.

When requested data is found in the cache memory, this is referred to as a cache hit. When the requested data is searched for but not found in the cache memory, this is referred to as a cache miss. A cache hit rate is defined as a ratio of cache hits to searches performed on the cache memory. A cache miss rate is defined as a ratio of cache misses to searches performed on the cache memory. The cache hit rate and the cache miss rate can be used as a measure of memory performance.

An address generated by the processor is referred to as a logical address, and an address loaded in a memory device is referred to as a physical address. Since a read or write operation, which is performed on the memory device by the processor, is associated with the translation between the logical address and the physical address, a logical-to-physical address mapping table has to be set so as to be suitable for recording or searching for the translation result.

When the logical-to-physical address mapping table is stored, memory space is inevitably occupied and the amount of hidden data becomes increasingly large, making it impossible to store an integrated mapping table in the cache memory. Therefore, the mapping table is divided into partitions, and entries have to be stored so that consecutive logical page addresses and correspondingly mapped physical page addresses are recorded on each partition of the mapping table. However, the capacity of the cache memory can generally store only some of the plurality of partitions.

For example, when the integrated mapping table is stored in the main memory and equally divided into 40 partitions, the capacity of the cache memory can store only four partitions among the 40 partitions. The cache hit rate is only 10% (i.e., 4/40), but the cache miss rate is 90% (i.e., 36/40). After each cache miss, the processor has to search for the requested data from the main memory, checking the physical page address mapped to the logical page address every cache miss. Therefore, the memory efficiency is adversely affected when the cache hit rate is not high.

SUMMARY

Various embodiments provide a memory access method of reading a memory device so as to create a simplified mapping table so that a memory space required for storing the simplified mapping table is smaller than a memory space required for storing an original mapping table.

An embodiment provides a memory access method including a selecting step, a scanning step, a determining step, and a storing step so as to selectively create a simplified mapping table.

At the selecting step, one of a plurality of partitions of an original mapping table may be selected so as to use one physical page address in the selected partition as a start physical page address.

At the scanning step, each entry of the selected partition may be scanned so as to search a randomly mapped entry among the selected entries.

At the determining step, it may be determined whether a memory space required for creating the simplified mapping table is smaller than a memory space required for the selected partition.

At the selecting step, the start physical page address, the number of the randomly mapped entries, and a logical page address and a physical page address recorded in each randomly mapped entry may be selectively stored according to the determination result of the determining step so as to create the simplified mapping table.

In an embodiment, when the determination result of the determining step is YES, a storing step may be performed so that a second memory device stores the start physical page address, the number of randomly mapped entries, and the logical page address and the physical page address recorded on each randomly mapped entry, so as to create the simplified mapping table, and when the determination result of the determining step is NO, the storing step may not be performed, and the selected partition is stored in the second memory device.

In an embodiment, the memory access method may further include a searching step of searching a physical page address mapped corresponding to a logical page address in the second memory device storing the simplified mapping table according to a command, acquiring the physical page address mapped corresponding to the logical page address by the simplified mapping table when the logical page address is searched from an arbitrary entry of the simplified mapping table, and calculating the physical page address mapped corresponding to the logical page address by offsets of the start physical page address and the logical page address when the logical page address is not searched from the entire entries of the simplified mapping table.

In an embodiment, the memory access method may further include a combining step of repeating the selecting step, the scanning step, the determining step, and the storing step to create a plurality of simplified mapping tables, combining the plurality of simplified mapping tables to create one simplified combined mapping table, and storing the simplified combined mapping table in the second memory device.

In an embodiment, the memory access method may further include a searching step of searching a physical page address mapped corresponding to a logical page address in the second memory device storing the simplified combined mapping table according to a command, acquiring the physical page address mapped corresponding to the logical page address by the simplified combined mapping table when the logical page address is searched from an arbitrary entry of the simplified combined mapping table, and acquiring the physical page address mapped corresponding to the logical page address through the calculation by offsets of the start physical page address and the logical page address when the logical page address is not searched from the entire entries of the simplified combined mapping table.

In an embodiment, the searching step may be performed through a binary search method.

In an embodiment, the memory access method may further include a first memory device and a second memory device. The first memory device may include the original mapping table and divide the original mapping table into the partitions, wherein each partition of the original mapping table may store a plurality of entries so as to record a plurality of consecutive logical page addresses and a plurality of physical page addresses mapped corresponding to the logical page addresses.

In an embodiment, the first memory device may be a main memory, and the second memory device may be a cache memory.

An embodiment provides a memory access method for creating a simplified mapping table, which is performed by a computer device including a first memory device including the original mapping table and dividing the original mapping table into the partitions, each partition of the original mapping table storing a plurality of entries so as to record a plurality of consecutive logical page addresses and a plurality of physical page addresses mapped corresponding to the logical page addresses, and a second memory device, the memory access method including a selecting step, a scanning step, and a storing step.

At the selecting step, one of a plurality of partitions of an original mapping table may be selected so as to use one physical page address in a selected partition as a start physical page address.

At the scanning step, each entry of the selected partition may be scanned so as to search a randomly mapped entry among the selected entries.

At the storing step, the start physical page address, the number of randomly mapped entries, and a logical page address and a physical page address recorded in each randomly mapped entry may be selectively stored.

In an embodiment, the memory access method may further include the step of determining whether a memory space required for creating the simplified mapping table is smaller than a space required for the selected partition, wherein the determining step is performed after the storing step.

An embodiment provides a method selectively including the step of sequentially dividing integrated logical-to-physical address mapping data into a plurality of logical-to-physical address partitions according to a preset size and randomly mapping to one logical-to-physical address partition in a preset ratio.

The method may include the following steps. First, a start physical page address corresponding to an offset of a first logical-to-physical page address may be determined and cached among the selected logical-to-physical address partitions, a plurality of random mappings may be cached among the selected logical-to-physical address partitions, and the other sequential mappings may be cached in the same manner as the method of caching the plurality of random mappings among the selected logical-to-physical address partitions.

Therefore, the simplified mapping table created through the memory access method according to the embodiment can replace the selected partition (that is, one non-simplified partition in the original mapping table). In addition, since the memory space required for the simplified mapping table is smaller than the memory space required for the selected partition, the effect of saving the memory space can be achieved. Furthermore, according to the memory access method according to the embodiment, since the simplified combined mapping table is created by the upper memory device (for example, the cache memory) having a fixed capacity, more partitions can be implemented to thereby improve the hit rate (for example, the cache hit rate). Moreover, a method of implementing the selected logical-to-physical address partition through the cache method different from the conventional method is further disclosed.

DETAILED DESCRIPTION

The advantages and characteristics of the present disclosure and a method for achieving the advantages and characteristics will be described through the following embodiments with reference to the accompanying drawings. However, the present disclosure is not limited to the embodiments described here, but may be embodied in different ways. The disclosed embodiments are provided to describe the present invention in detail, such that it can be easily carried out by those skilled in the art to which the present disclosure pertains. Throughout the specification, reference to "an embodiment," "another embodiment," or the like is not necessarily to only one embodiment, and different references to any such phrase are not necessarily to the same embodiment(s).

Figure 1:
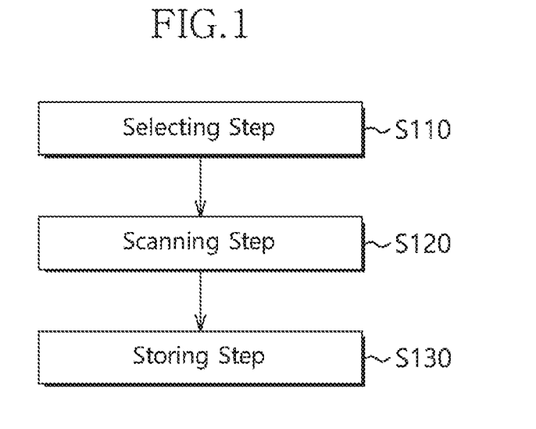
FIG. 1 is a flowchart illustrating a memory access method in accordance with an embodiment.

FIG. 1 is a flowchart illustrating a memory access method in accordance with an embodiment. Referring to FIG. 1, the memory access method may include a selecting step S110, a scanning step S120, and a storing step S130.

The memory access method may be performed by a computer device including an upper memory device (for example, a cache memory) and a lower memory device (for example, a main memory). The lower memory device may include an integrated original logical-to-physical address mapping table (original mapping table). The original mapping table may be divided into a plurality of partitions (or segments). A plurality of entries stored in each partition of the original mapping table records a plurality of consecutive logical page addresses and a plurality of physical page addresses correspondingly mapped to the plurality of logical page addresses.

Figure 2:
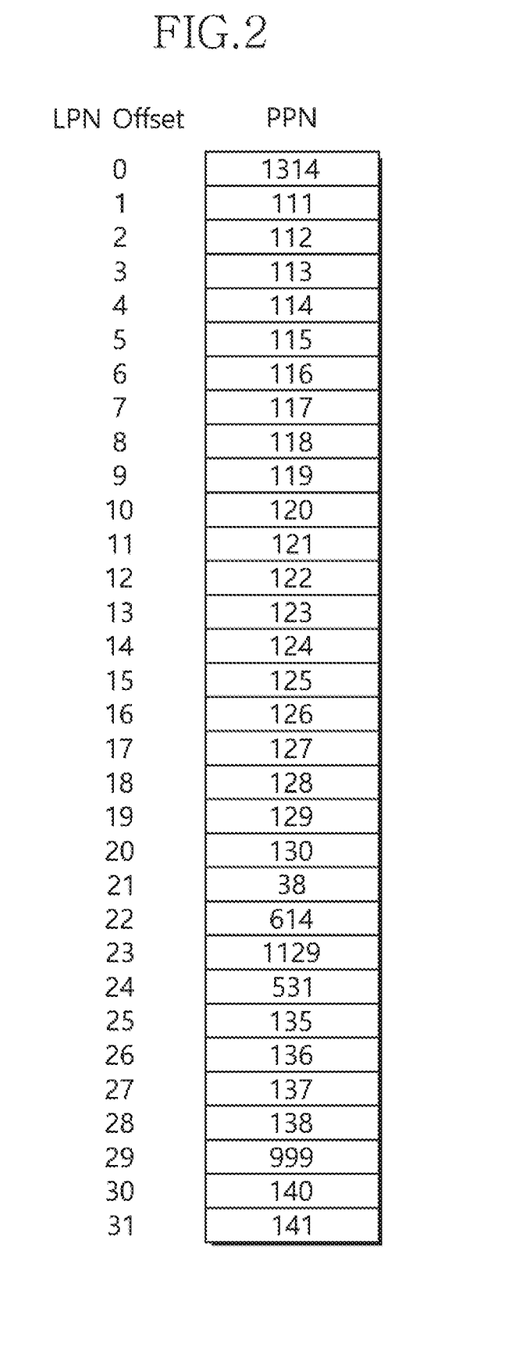
FIG. 2 is a diagram illustrating partition of an original mapping table.

FIG. 2 is a diagram illustrating one partition in an original mapping table. Referring to FIG. 2, 32 entries exist in the partition. Each entry records one logical page address (or logical page number (LPN)) and the physical page address (or physical page number (PPN)) mapped to that logical page address. In the illustrated embodiment, the plurality of logical page addresses of FIG. 2 are expressed through offsets. The first entry records one logical page address (offset 0) and one corresponding physical page address 1314. The second entry records another logical page address (offset 1) and one corresponding physical page address 111.

The 32 logical page addresses are consecutively recorded. For example, when the logical page address represented by offset 0 is 1024, the logical page address represented by the offset 1 is 1025, and the logical page address represented by offset 2 is 1026.

Offsets of different partitions may represent different logical page addresses. For example, in another partition, a logical page address represented by offset 0 may be 512, a logical page address represented by offset 1 may be 513, and a logical page address represented by offset 2 may be 514.

All of the partitions may configure the integrated original mapping table. For example, 40 partitions may exist, and each partition may include 32 entries. When each entry records one logical page address, the integrated original mapping table may include 1,280 consecutive logical page addresses 0 to 1279 and 1280 corresponding physical page addresses.

In this embodiment, since data described in the original mapping table is logical-to-physical address mapping data, the integrated original mapping table may be denoted as an integrated logical-to-physical address mapping data, and the selected partition may be the same as the selected logical-to-physical address partition.

In addition, the original mapping table in this embodiment may be uniformly or non-uniformly divided into a plurality of partitions. Furthermore, the original mapping table may sequentially divide the integrated logical-to-physical address mapping table into a plurality of logical-to-physical address partitions according to a set size. For example, when the set size is 128 bytes (including 32 entries) and the original mapping table is 5,000 bytes (including 1,250 entries), the original mapping table may be sequentially divided into 40 partitions. The size of 39 partitions may be 128 bytes, and the size of one partition may be 8 bytes (i.e., 5,000−39*128=8).

In FIG. 2, most physical page address numbers (PPNs) may be consecutive (that is, most logical page addresses may be sequentially mapped to the physical page addresses), and only a few physical page addresses may not follow the number order. This is because when the generality is not lost, most mapping is sequential mapping (that is, the plurality of consecutive logical page addresses are continuously mapped to the plurality of consecutive physical page addresses). Therefore, only a small portion of the mapping is random mapping. In addition, in FIG. 2, the logical page addresses of the randomly mapped entries may be the following six entries, that is, offset 0 (PPN 1314), offset 21 (PPN 38), offset 22 (PPN 614), offset 23 (PPN 1129), offset 24 (PPN 531), and offset 29 (PPN 999).

Referring to FIGS. 1 and 2, at the selecting step S110, one partition of the plurality of partitions of the original mapping table may be selected as a selected partition, and the physical page address of one of the partitions may be used as a start physical page address. For example, the partition of FIG. 2 may be one of the 40 partitions of the integrated original mapping table. At the selecting step S110, the partition of FIG. 2 may be the selected partition. In this manner, the physical page address of the first entry (offset 0) may be used as the start physical page address. Although the physical page address of the first entry (offset 0) is 1314, the start physical page address may be corrected to 110 because the first entry is the random mapping.

At the scanning step S120, each entry of the selected partition may be scanned so as to search for the randomly scanned entry among the selected entries. For example, when the partition of FIG. 2 is selected in the selecting step S110, the first entry (offset 0) to the last entry (offset 31) may be sequentially scanned so as to search for the randomly mapped entry at the scanning step S120. In FIG. 2, six randomly mapped entries, of which the logical page addresses are: offset 0, offset 21, offset 22, offset 23, offset 24, and offset 29, may be searched.

At the storing step S130, in order to create a simplified mapping table, the upper memory device (for example, the cache memory) may store the start physical page address, the number of the randomly mapped entries, and the logical page address and the physical page address recorded on each randomly mapped entry.

Figure 3:
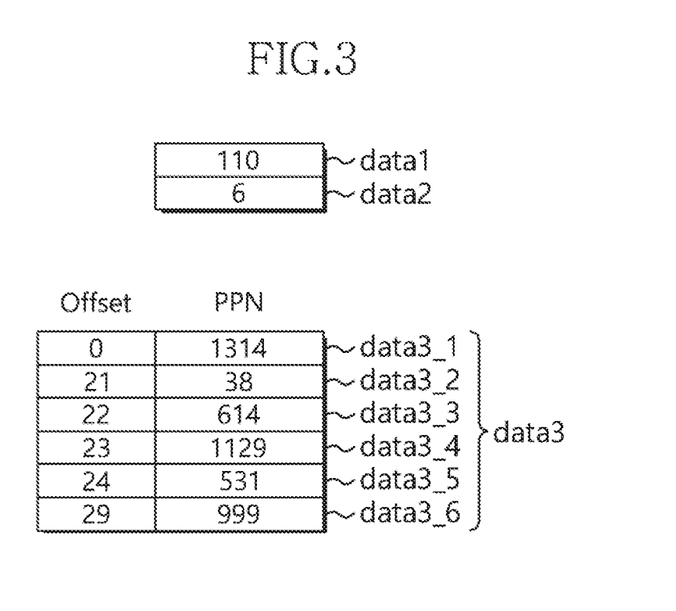
FIG. 3 is a diagram illustrating a simplified mapping table.

FIG. 3 is a diagram illustrating a simplified mapping table. Referring to FIG. 3, the simplified mapping table may record first data (i.e., start physical page address) data1, second data (i.e., the number of randomly mapped entries) data2, and third data (i.e., the entire randomly mapped entries) data3. The first to sixth randomly mapped entries may be expressed by data data3_1 to data3_6.

In a conventional method, the upper memory device (for example, the cache memory) has to store each entry of the selected partition in an integrated manner. For example, assuming that the capacity of the memory required for each entry is 5 bytes, when storing the partition of FIG. 2, the conventional upper memory requires the storage space of 128 bytes (=32*4) so as to record the selected partition. In contrast, assuming that 4 bytes are required in storing the first data (i.e., start physical page address) data1, 4 bytes are required in storing the second data (i.e., the number of randomly mapped entries) data2, and 30 bytes (=6*5) are required in storing the third data (i.e., the entire randomly mapped entries) data3, the simplified mapping table illustrated in FIG. 3 requires a storage space of 38 bytes (4+4+30) to store the selected partitions in an integrated manner.

In the calculation of the above example, not 4 bytes but 5 bytes are required so as to store the third data (i.e., each randomly mapped entry) data3. One byte insertion tag or code is separately required for each entry. Thus, the corresponding entry which is the randomly mapped entry is distinguished from a non-randomly mapped entry.

In the above example, the memory space (i.e., 38 bytes) required for storing the simplified mapping table of one partition is much smaller than the memory space (i.e., 128 bytes) required for storing the original mapping table of one partition. Therefore, the memory access method in accordance with the present embodiment may save memory storage space of 90 bytes.

Figure 4:
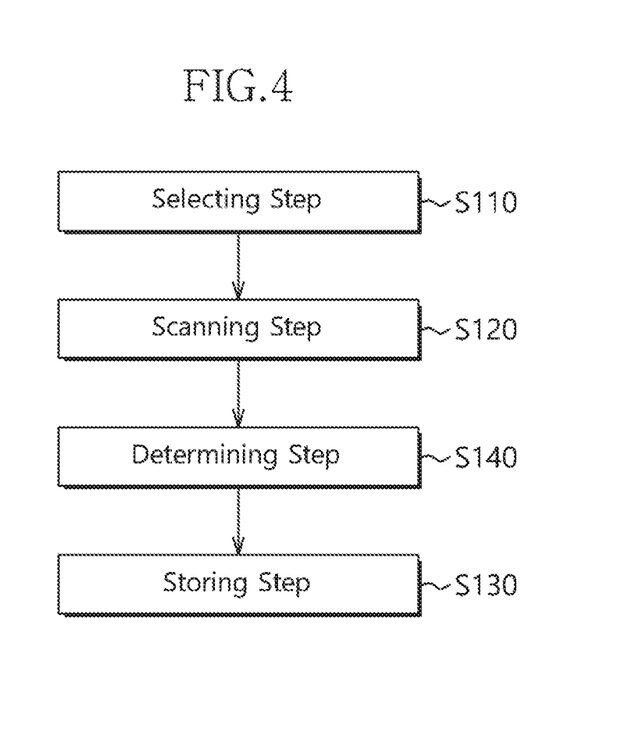
FIG. 4 is a flowchart illustrating a memory access method in accordance with another embodiment.

FIG. 4 is a flowchart illustrating a memory access method in accordance with another embodiment. Referring to FIG. 4, the memory access method of FIG. 4 further includes a determining step S140 in addition to the steps of memory access method of FIG. 1. At the determining step S140, it may be determined whether the memory space required for the simplified mapping table is smaller than the memory space required for the selected partition (that is, one non-simplified partition in the original mapping table).

In the above example, since the memory space (i.e., 38 bytes) required for the simplified mapping table is smaller than the memory space (i.e., 128 bytes) required for the selected partition, the result of the determination made at step S140 is "YES".

Another example, which is possible but not very likely, is described below. Since most entries use the random mapping, the memory space required for the simplified mapping table (4+4+30*5=158 bytes, assuming 30 entries are used the random mapping) is larger than the memory space (128 bytes) required for the selected partition. Thus, in this example, the result of the determination made at step S140 is "NO".

The result of the determining step S140 (determination result) may be used to determine whether the selected partition has to be replaced with the simplified mapping table. Specifically, when the determination result is "YES", it means that the memory space can be saved by using the simplified mapping table. Therefore, the simplified mapping table has to be used instead of the partition of the original mapping table. On the other hand, when the determination result is "NO", it means that more memory space is required if the simplified mapping table is used. Therefore, the simplified mapping table should not be used instead of the selected partition of the original mapping table. Therefore, the storing step S130 of FIG. 1 is executed in any case as compared with the storing step S130 of FIG. 4, which is selectively performed according to the result of the determining step S140.

Since the determining step S140 may be performed through an algorithm, the memory space required for the simplified mapping table and the memory space required for the partition of the original mapping table may be respectively calculated by the algorithm, and two values may be compared to obtain the determination result. The upper memory device (for example, the cache memory) may determine whether the simplified mapping table or the selected partition is stored according to the determination result.

As described above, FIG. 4 illustrates a case where the determining step S140 is performed before the storing step S130. When the determination result is "YES", the storing step S130 may be performed, and when the determination result is "NO", the storing step S130 may not be performed. That is, the simplified mapping table of the partition may not be created. When the determination result is "NO", the selected partition may be stored as in the conventional method.

However, in other implementable embodiments, the determining step S140 may be performed after the storing step S130, the simplified mapping table may be first stored before the determination result is generated. Therefore, the present invention is not limited to the execution order of the steps illustrated in FIG. 4.

Figure 5:
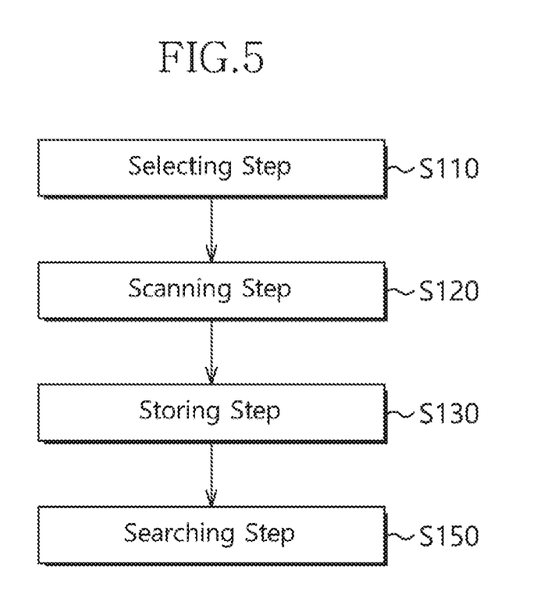
FIG. 5 is a flowchart illustrating a memory access method in accordance with another embodiment.

FIG. 5 is a flowchart illustrating a memory access method in accordance with another embodiment. Referring to FIG. 5, the memory access method of FIG. 5 further includes a searching step S150 in addition to the steps of the memory access method of FIG. 1. The searching step S150 may be performed according to a command that may be generated from the processor of the computer device.

The command may be a read command for reading data stored in the upper or lower memory device. The read command may request data from the upper memory device and thus may cause a search to be executed on the cache memory. Since the partition of the original mapping table in the upper memory device has already been replaced with the simplified mapping table, the data may be read by using the simplified mapping table when the logical page address of the requested data exists in the partition.

For example, referring to FIGS. 2 and 3, when the logical page address of the requested data is 1027 and the logical page address corresponding to the partition of FIG. 2 is 1024 to 1055, the logical page address 1027 of the requested data belongs to the logical page address 1024 to 1055 of the partition, and thus the simplified mapping table may be used. Since the logical page address of the first entry is 1024, the fourth entry corresponding to the logical page address of the requested data may be calculated. Alternatively, the others (1027%32=3)(1027 mod 32=3) is calculated and it can be seen that the logical page address of the requested data corresponds to the entry of the offset 3 of the partition.

After acquiring the fourth entry (offset 3) of the partition corresponding to the logical page address of the requested data, whether the entry of offset 3 exists in the simplified mapping table may be determined.

The searching method of the searching step S150 will be described below. In the first search, the first randomly mapped entry data3_1 is compared with the logical page address of the requested data. Then, when it is found that offset 0 is different from offset 3, the first search is deemed to have failed. In the second search, the offset of the second randomly mapped entry data3_2 is compared with the offset of the logical page address of the requested data. Then, when it is found that offset 21 is different from offset 3, the second search is deemed to have failed. In the above example, since it has been found in the second search that the offset 21 of the entry is greater than the offset 3 of the requested data, the third to sixth searches need not be performed. That is, the offsets of the third to sixth randomly mapped entries data3_3 to data3_6 need not be compared with the offset 3 of the requested data, because the offsets of the third to sixth randomly mapped entries data3_3 to data3_6 are greater than the offset 3 of the requested data. Therefore, it is determined that the logical page address of the requested data does not exist in the entire entries of the simplified mapping table.

Another searching method of the searching step S150 will be described below. The number of searches performed is the same as the number of randomly mapped entries. In the above example of FIGS. 2 and 3, since the number of randomly mapped entries is 6, the offsets of the first to sixth randomly mapped entries data3_1 to data3_6 are compared with the offset of the requested data. That is, the comparing operations are performed six times. Then, it is determined that the offset of the requested data does not exist in the entire entries of the simplified mapping table.

The above-described searching step may be performed through a binary search method. In the first search, the third entry (i.e., offset 22) and the fourth entry (i.e., offset 23) may be selected among the six randomly mapped entries, and the average value of the two offsets may be calculated. Then, the average value (i.e., 22.5) may be compared with the offset 3 of the requested data. Since the offset 3 of the requested data is smaller than the average value (i.e., 22.5), the search may be performed only on the first to third entries in the next search. In the second search, the middle entry (that is, the second entry) may be selected among the three randomly mapped entries. Then, the offset 21 of the second entry may be compared with the offset 3 of the requested data. Since the offset 3 of the requested data is smaller than the offset 21 of the second entry, the search may be performed only on the first entry in the next search. In the third search, when it is found that the offset 0 of the first entry is different from the offset 3 of the requested data, it is determined that the offset of the requested data does not exist in the entire entries of the simplified mapping table.

Regardless of which search method is used, the offset of the requested data either corresponds or does not correspond to one entry in the simplified mapping table. A main difference of the above-described search methods is a difference in the search times.

When the logical page address of the requested data is searched from an arbitrary entry of the simplified mapping table, the physical page address mapped by the logical page address may be acquired through the simplified mapping table. When the logical page address is not searched from the entire entries of the simplified mapping table, the physical page address mapped to the logical page address may be calculated by the start physical page address and the offset.

For example, in the above example, since the data (offset 22) having the logical page address of 1046 cannot be searched from the third entry, it can be seen that the physical page address mapped to the logical page address of the requested data is 614. However, since the data (offset 3) having the logical page address of 1027 does not exist in any entries, it can be seen that the physical page address mapped to the logical page address of the requested data is 113 through the calculation by the start physical page address and the offset: start physical page address 110+offset 3=113.

Figure 6:
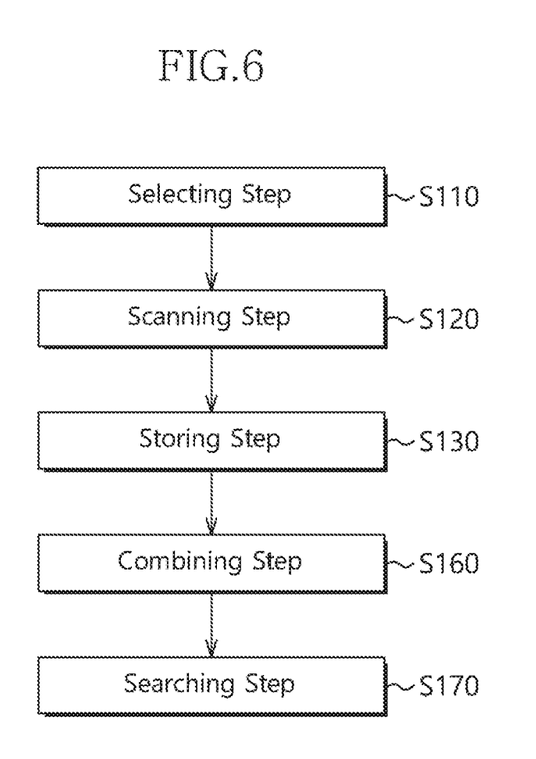
FIG. 6 is a flowchart illustrating a memory access method in accordance with still another embodiment.

FIG. 6 is a flowchart illustrating a memory access method in accordance with still another embodiment. Referring to FIG. 6, the memory access method of FIG. 6 further includes a combining step S160 and a searching step S170 in addition to the steps of the memory access method of FIG. 1.

At the combining step S160, the selecting step S110, the scanning step S120, and the storing step S130 may be repeated to create a plurality of simplified mapping tables, and the plurality of simplified mapping tables may be combined to create one simplified combined mapping table.

For example, it is assumed that the capacity of the upper memory device (for example, the cache memory) is 512 bytes, and the memory space requested for the mapping table simplified with a sufficient number in the plurality of simplified mapping tables is 64 bytes or less. In this case, 64 bytes are designed as a set size, and eight simplified mapping tables of the partitions (512/64=8) which are within the set size (64 bytes), include the random mapping (that is, one or more random mapping entries), and are randomly mapped within a set ratio, may be stored in the cache memory. Regarding the set ratio, when it is 0.25, for example, eight or less random mapping entries are selected among the 32 entries (8/32=0.25).

As compared with the cache memory of the conventional method, only four partitions (512/128=4) within a set size (12 bytes) may be stored. After the plurality of simplified mapping tables are combined to create the simplified combined mapping table, more partitions (8 is greater than 4) may be stored in the memory device having the same capacity, thereby increasing the cache hit rate. For example, the cache hit rate increases from 10% (i.e., 4/40) to 20% (i.e., 8/40), thereby improving the access performance of the memory device.

The searching step S170 is similar to the searching step S150 of FIG. 5, except that the simplified combined mapping table is searched in the searching step S170.

Figure 7:
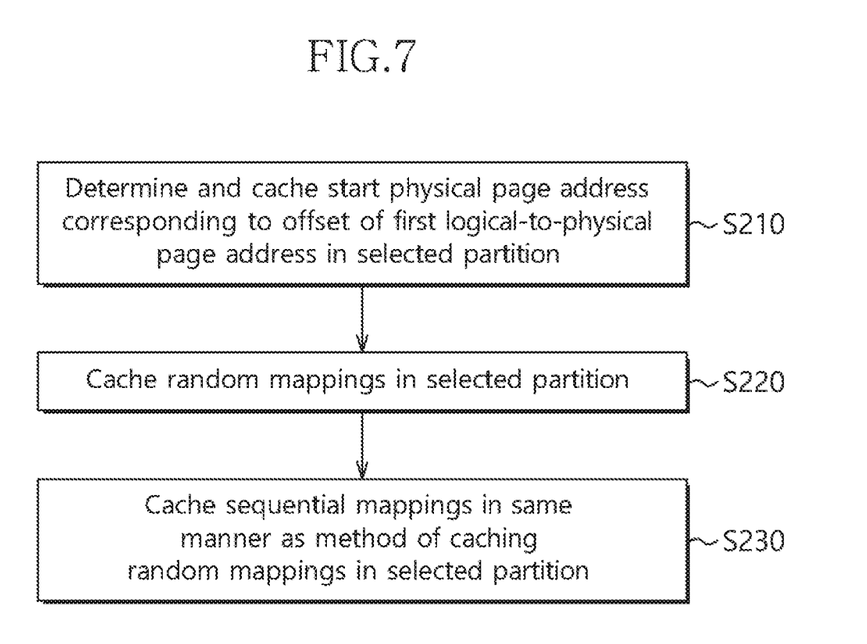
FIG. 7 is a flowchart illustrating a memory access method in accordance with an embodiment.

FIG. 7 is a flowchart illustrating a memory access method in accordance with an embodiment. Referring to FIG. 7, the method sequentially divides the integrated logical-to-physical address mapping data into the plurality of logical-to-physical address partitions according to the preset size, and one logical-to-physical address partition is selected. The selected logical-to-physical address partition should include the random mapping, and the number of randomly mapped partitions included in the selected logical-to-physical address partitions should be within a preset ratio.

For example, when (L+M+N) logical-to-physical address partitions (where L, M, and N are positive integers) exist, the set ratio is 0.25, the number of random mappings of L logical-to-physical address partitions exceeds the set ratio, the number of random mappings of M logical-to-physical address partitions is 0, and N logical-to-physical address partitions do not exceed the set ratio and include random mapping, one of the N logical-to-physical address partitions should be selected as the selected logical-to-physical address partition.

The method of FIG. 7 may include the following steps. At a first step S210, the start physical page address corresponding to the offset of the first logical-to-physical page address may be determined and cached among the selected logical-to-physical address partitions. At a second step S220, a plurality of random mappings may be cached among the selected logical-to-physical address partitions. At a third step S230, the other sequential mappings may be cached in the same manner as the method of caching the plurality of random mappings among the selected logical-to-physical address partitions.

Through the above steps, the memory access method of the present embodiment may implement the selected logical-to-physical address partitions according to the cache method of embodiments of the present invention and differently from the conventional method.

In summary, the simplified mapping table created through the memory access method according to embodiments of the present invention can replace the selected partition (that is, one non-simplified partition in the original mapping table). In addition, since the memory space required for the simplified mapping table is smaller than the memory space required for the selected partition, memory space can be saved. Furthermore, according to the memory access methods of the present invention, since the simplified combined mapping table is created by the upper memory device (for example, the cache memory) having a fixed capacity, more partitions can be implemented to thereby improve the hit rate (for example, the cache hit rate). In addition, a method of implementing the selected logical-to-physical address partition through the cache method, which is different from the conventional method, is further disclosed.

While various embodiments have been illustrated and described, it will be understood to those skilled in the art in light of the present disclosure that the embodiments described are examples to which various modifications may be made within the scope of the present invention. Accordingly, the operating method of a data storage device described herein should not be limited based on the described embodiments. Rather, the present invention encompasses all modifications and variations thereof that fall within the scope of the claims.

What is claimed is:
1. A memory access method, comprising:
selecting one of a plurality of partitions of an original mapping table so as to use one physical page address in a selected partition as a start physical page address;

scanning each entry of the selected partition so as to search for randomly mapped entries in the selected partition;

determining whether a memory space required for creating a simplified mapping table is smaller than a memory space required for the selected partition; and selectively storing the simplified mapping table including the start physical page address, a number of the randomly mapped entries found in the search, and a logical page address and a physical page address recorded on each randomly mapped entry, according to the result of the determining step.

2. The memory access method according to claim 1, wherein when the result of the determining step indicates that the memory space required for creating the simplified mapping table is smaller than the memory space required for the selected partition, the storing step is performed so that a second memory device stores the start physical page address, the number of the randomly mapped entries, and the logical page address and the physical page address recorded on each randomly mapped entry, so as to create the simplified mapping table, and when the determination result of the determining step indicates that the memory space required for creating the simplified mapping table is not smaller than the memory space required for the selected partition, the storing step is not performed, and the selected partition is stored in the second memory device.

3. The memory access method according to claim 1, further comprising a searching step of:

searching for, according to a command, a physical page address correspondingly mapped to a logical page address in the second memory device storing the simplified mapping table, acquiring the physical page address correspondingly mapped to the logical page address by the simplified mapping table when the logical page address is searched for in an arbitrary entry of the simplified mapping table, and calculating the physical page address correspondingly mapped to the logical page address by offsets of the start physical page address and the logical page address when the logical page address is not searched for in all entries of the simplified mapping table.

4. The memory access method according to claim 3, wherein the searching step is performed through a binary search method.

5. The memory access method according to claim 1, further comprising a combining step of:

repeating the selecting step, the scanning step, the determining step, and the storing step to create a plurality of simplified mapping tables, combining the plurality of simplified mapping tables to create one simplified combined mapping table, and storing the simplified combined mapping table in the second memory device.

6. The memory access method according to claim 5, further comprising a searching step of:

searching for, according to a command, a physical page address correspondingly mapped to a logical page address in the second memory device storing the simplified combined mapping table, acquiring the physical page address correspondingly mapped to the logical page address in the simplified combined mapping table when the logical page address is searched for in an arbitrary entry of the simplified combined mapping table, and acquiring the physical page address correspondingly mapped to the logical page address through calculation by offsets of the start physical page address and the logical page address when the logical page address is not searched for in all of the entries of the simplified combined mapping table.

7. The memory access method according to claim 6, wherein the searching step is performed through a binary search method.

8. The memory access method according to claim 1, wherein the memory device includes a first memory device and a second memory device, and wherein the first memory device includes the original mapping table divided into the partitions, each partition of the original mapping table storing a plurality of entries so as to record a plurality of consecutive logical page addresses and a plurality of physical page addresses correspondingly mapped to the logical page addresses.

9. The memory access method according to claim 8, wherein the first memory device includes a main memory, and the second memory device includes a cache memory.

10. A memory access method for creating a simplified mapping table, which is performed by a computer device including a first memory device and a second memory device, the first memory device including an original mapping table divided into the partitions, each partition of the original mapping table storing a plurality of entries so as to record a plurality of consecutive logical page addresses and a plurality of physical page addresses correspondingly mapped to the logical page addresses, the memory access method comprising:

selecting one of a plurality of partitions of the original mapping table so as to use one physical page address in a selected partition as a start physical page address;

scanning each entry of the selected partition so as to search randomly mapped entries among the plurality of entries of the selected partition; and selectively storing the simplified mapping table including the start physical page address, a number of the randomly mapped entries found in the scanning, and a logical page address and a physical page address recorded in each randomly mapped entry.

11. The memory access method according to claim 10, further comprising determining whether a memory space required for creating the simplified mapping table is smaller than a space required for the selected partition, wherein the determining step is performed after the storing step.

12. A method of accessing a memory device, comprising:

selecting one partition among a plurality of partitions in in an original mapping table, the selected partition including randomly mapped entries;

determining whether a first memory space required for creating a simplified mapping table is smaller than a second memory space required for the selected partition; and creating the simplified mapping table including one physical page address in the selected partition as a start physical page address, a number of the randomly mapped entries in the selected partition, and a logical page address and a physical page address recorded on each randomly mapped entry, when it is determined that the first memory space is smaller than the second memory space.

* * * * *